US009371630B1

(12) United States Patent
Johannsen

(10) Patent No.: US 9,371,630 B1
(45) Date of Patent: Jun. 21, 2016

(54) DETERMINATION OF UNDERCARRIAGE IDLER AND ROLLER WEAR BASED ON FINAL DRIVE SPEED

(71) Applicant: Caterpillar Inc., Peoria, IL (US)

(72) Inventor: Eric Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 13 days.

(21) Appl. No.: 14/576,601

(22) Filed: Dec. 19, 2014

(51) Int. Cl.
G06F 11/30 (2006.01)
E02F 9/26 (2006.01)
G07C 5/08 (2006.01)
B62D 55/06 (2006.01)
E02F 9/02 (2006.01)

(52) U.S. Cl.
CPC . *E02F 9/26* (2013.01); *B62D 55/06* (2013.01); *E02F 9/02* (2013.01); *G07C 5/0808* (2013.01)

(58) Field of Classification Search
CPC ...... B62D 55/202; B62D 55/20; B62D 55/12; E02F 9/2217
USPC ......... 701/34.4, 29.1; 180/6.7, 65.1; 198/502.1, 959; 305/163, 193
See application file for complete search history.

(56) References Cited

U.S. PATENT DOCUMENTS

| 3,815,426 A | 6/1974 | Rohner |
| 3,958,445 A | 5/1976 | Howard et al. |
| 4,336,595 A * | 6/1982 | Adams ............... G01M 5/0016 377/19 |
| 4,790,190 A | 12/1988 | Bambara et al. |
| 4,928,521 A | 5/1990 | Jardine |
| 5,348,515 A | 9/1994 | Miller |
| 5,436,612 A | 7/1995 | Aduddell |
| 5,636,026 A | 6/1997 | Mian et al. |
| 5,654,500 A * | 8/1997 | Herron ............... G01N 3/00 73/112.01 |
| 6,024,183 A | 2/2000 | Dietz et al. |
| 6,027,185 A | 2/2000 | Crabb |
| 6,107,917 A | 8/2000 | Carrender et al. |
| 6,250,429 B1 | 6/2001 | Kramer |
| 6,276,768 B1 | 8/2001 | Miller |
| 6,305,763 B1 | 10/2001 | Oertley |
| 6,354,678 B1 | 3/2002 | Oertley |
| 6,360,850 B1 | 3/2002 | Odisho et al. |

(Continued)

FOREIGN PATENT DOCUMENTS

| EP | 2175423 A2 | 4/2010 |
| EP | 2548665 A1 | 1/2013 |

(Continued)

OTHER PUBLICATIONS

Zhang, Z X et al., Measurements of cutter forces and cutter temperature of boring machine in Aspo Hard Rock Laboratory, Tech. Rpt TR-01-34, Apr. 2001.

(Continued)

*Primary Examiner* — Gertrude Arthur Jeanglaud
(74) *Attorney, Agent, or Firm* — Baker & Hostetler LLP

(57) ABSTRACT

System and methods for determining wear of a rotational component of an undercarriage for a machine are disclosed. One method includes determining a rotational speed of a drive sprocket of the undercarriage, determining a rotational speed of the rotational component, determining a size parameter of the rotational component based on at least the determined rotational speed of the drive sprocket and the determined rotational speed of the rotational component, and determining the wear of the rotational component based on the determined size parameter of the rotational component.

20 Claims, 4 Drawing Sheets

(56) References Cited

U.S. PATENT DOCUMENTS

| | | | |
|---|---|---|---|
| 6,431,008 B1 | 8/2002 | Oertley et al. |
| 6,477,893 B1 | 11/2002 | Djordjevic |
| 6,569,046 B1 | 5/2003 | Gregg |
| 6,682,155 B2 | 1/2004 | Hoff et al. |
| 6,845,306 B2 | 1/2005 | Henry et al. |
| 6,868,711 B2 | 3/2005 | Ebi |
| 6,948,783 B2 | 9/2005 | Hoff |
| 7,014,271 B2 | 3/2006 | Burger et al. |
| 7,032,740 B2 | 4/2006 | Hochhaus et al. |
| 7,172,257 B2 | 2/2007 | Tamaru et al. |
| 7,177,553 B2 | 2/2007 | Ono |
| 7,210,750 B2 | 5/2007 | Yamamoto et al. |
| 7,237,631 B2 | 7/2007 | Livesay et al. |
| 7,239,242 B2 | 7/2007 | Ghosh |
| 7,374,257 B2 | 5/2008 | Oertley |
| 7,507,965 B2 | 3/2009 | Lane et al. |
| 7,540,374 B2 | 6/2009 | Rathbun et al. |
| 7,698,946 B2 | 4/2010 | Clarke et al. |
| 7,764,173 B2 | 7/2010 | Yamagiwa |
| 7,908,928 B2 | 3/2011 | Vik et al. |
| 7,914,086 B2 | 3/2011 | Mulligan |
| 8,100,483 B2 * | 1/2012 | Diekevers .................. 305/104 |
| 8,169,311 B1 | 5/2012 | Breed |
| 8,326,549 B2 | 12/2012 | Ishizaki et al. |
| 8,335,606 B2 | 12/2012 | Mian et al. |
| 8,398,182 B2 | 3/2013 | Simula et al. |
| 8,426,813 B2 | 4/2013 | Furry |
| 8,540,325 B2 | 9/2013 | Diekevers et al. |
| 8,543,283 B2 | 9/2013 | Boss et al. |
| 8,596,126 B2 | 12/2013 | Oliver et al. |
| 8,600,611 B2 | 12/2013 | Seize |
| 2002/0116992 A1 | 8/2002 | Rickel |
| 2006/0044146 A1 | 3/2006 | Ferguson et al. |
| 2006/0243839 A9 | 11/2006 | Barscevicius et al. |
| 2007/0044447 A1 | 3/2007 | Viaud |
| 2007/0088523 A1 | 4/2007 | Keller et al. |
| 2008/0284245 A1 * | 11/2008 | Livesay ............... B62D 55/14 305/193 |
| 2009/0099886 A1 | 4/2009 | Greiner et al. |
| 2009/0297273 A1 | 12/2009 | Lindbergh et al. |
| 2009/0313860 A1 | 12/2009 | Breiner et al. |
| 2010/0013594 A1 | 1/2010 | Komine et al. |
| 2010/0139993 A1 * | 6/2010 | Sebright ............... B62D 55/21 180/6.7 |
| 2011/0046857 A1 | 2/2011 | Farmer et al. |
| 2012/0043980 A1 | 2/2012 | Davies |
| 2013/0082846 A1 | 4/2013 | McKinley et al. |
| 2013/0255354 A1 | 10/2013 | Hawkins et al. |
| 2014/0105481 A1 | 4/2014 | Hasselbusch et al. |
| 2014/0229120 A1 | 8/2014 | Luharuka et al. |

FOREIGN PATENT DOCUMENTS

| | | |
|---|---|---|
| JP | 2000042894 A | 2/2000 |
| KR | 101087961 B1 | 12/2011 |
| WO | 99/51996 A1 | 10/1999 |
| WO | 2006/116758 A3 | 11/2006 |
| WO | 2010/117331 A1 | 10/2010 |
| WO | 2013/057275 A1 | 4/2013 |
| WO | 2014/000507 A1 | 1/2014 |

OTHER PUBLICATIONS

Behmlander, Matthew J., et al., "Erosion Monitoring System for Ground Engaging Tool," U.S. Appl. No. 13/866,394, filed Apr. 19, 2013.

De Broissia, M. et al, "Global Optimisation of Disc Cutter Tool Life for Tunnel Boring Machine Preparing 4th Eurothen Workshop" Bougues Travaux Publics.

EPO International Search Report, PCT/US2006/016518, filed Oct. 30, 2006.

EPO International Search Report, PCT/US2012/057831, filed Sep. 28, 2012.

McKinley, Timothy Allen, et al., "Sensor System and Method," U.S. Appl. No. 13/628,662, filed Sep. 27, 2012.

Shanahan, A. Cutter Instrumentation System for Tunnel boring Machines, The Robbins Co., Kent, WA available Sep. 17, 2010.

* cited by examiner

US 9,371,630 B1

DETERMINATION OF UNDERCARRIAGE IDLER AND ROLLER WEAR BASED ON FINAL DRIVE SPEED

TECHNICAL FIELD

This disclosure relates generally to undercarriage components and, more particularly, to determination of wear of undercarriage components.

BACKGROUND

Mining and construction machines, such as hydraulic mining shovels, excavators, wheel loaders, cable shovels, bucket wheels, draglines, and the like, commonly employ undercarriage track systems. The undercarriage track systems generally employ a track chain assembly formed by interconnected track links. The track chain assembly is generally guided and supported by rollers. The contact between the track links and the rollers may create high stresses, which can cause, inter alia, wear along contact surfaces of the rollers and track links. Conventionally, wear of undercarriage components may be measured by ultrasound. However, such measurement is typically infrequent and time consuming. Various direct measure sensors may also be utilized.

The undercarriage track system may be monitored to determine when to service the undercarriage track system. U.S. Patent application No. 2013/0255354 to Hawkins et al., for example, discloses an undercarriage monitoring device having a roller assembly including a fixed roller component and a bushing. An opening is formed within the fixed roller component. A first sensor is disposed within the opening of the fixed roller component over the bushing. The first sensor is configured to directly sense a first physical characteristic of the bushing such as an operational temperature of the bushing. However, the monitoring system of Hawkins et al. is concerned with operational conditions of a bushing to ensure proper lubrication and does not provide for mechanism to determine undercarriage idler and roller wear based on final drive speed. These and other shortcomings of the prior art are addressed by the disclosure.

SUMMARY

This disclosure relates to system and methods for determination of wear of one or more undercarriage components such as rotational components. In one aspect, a method may include determining a rotational speed of a drive sprocket of the undercarriage, determining a rotational speed of the rotational component, determining a size parameter of the rotational component based on at least the determined rotational speed of the drive sprocket and the determined rotational speed of the rotational component, and determining the wear of the rotational component based on the determined size parameter of the rotational component.

In another aspect, a method may include receiving information relating to a rotational speed of a drive sprocket of the undercarriage system, where the drive sprocket is configured to engage a track chain assembly at a first radial distance from a first axis of rotation, receiving information relating to a rotational speed of a rotational component of the undercarriage system, where the rotational component is configured to engage the track chain assembly at a second radial distance from a second axis of rotation, determining the second radial distance based on at least the determined rotational speed of the drive sprocket, the determined rotational speed of the rotational component, and the first radial distance, and determining the wear of the rotational component based on the determined second radial distance.

In yet another aspect, a system may include a processor and a memory bearing instructions that, upon execution by the processor, cause the system at least to: determine a rotational speed of a drive sprocket of the undercarriage, wherein the drive sprocket is configured to rotate about a first axis, determine a rotational speed of the rotational component, wherein the rotational component, is configured to rotate about a second axis that is parallel to the first axis, determine a size parameter of the rotational component based on at least the determined rotational speed of the drive sprocket and the determined rotational speed of the rotational component, and determine the wear of the rotational component based on the determined size parameter of the rotational component.

DETAILED DESCRIPTION

The systems and methods disclosed herein include a roller (e.g., roller assembly) and idler (e.g., idler wheel) of an undercarriage track system for a machine. In certain aspects, a sensor is configured to detect the rotational speed of the roller and/or the idler. The rotational speed of the roller and/or the idler can be compared to the output speed of the final drive to determine wear on the roller and/or the idler. As an example, the rotational speed of the roller and/or the idler will increase relative to the speed of the final drive as the roller and/or the idler wear. Determining the wear on the roller and/or the idler may allow an operator or an original equipment manufacturer to predict further wear on the roller and/or the idler and to determine when to schedule maintenance on the machine.

Figure 1:
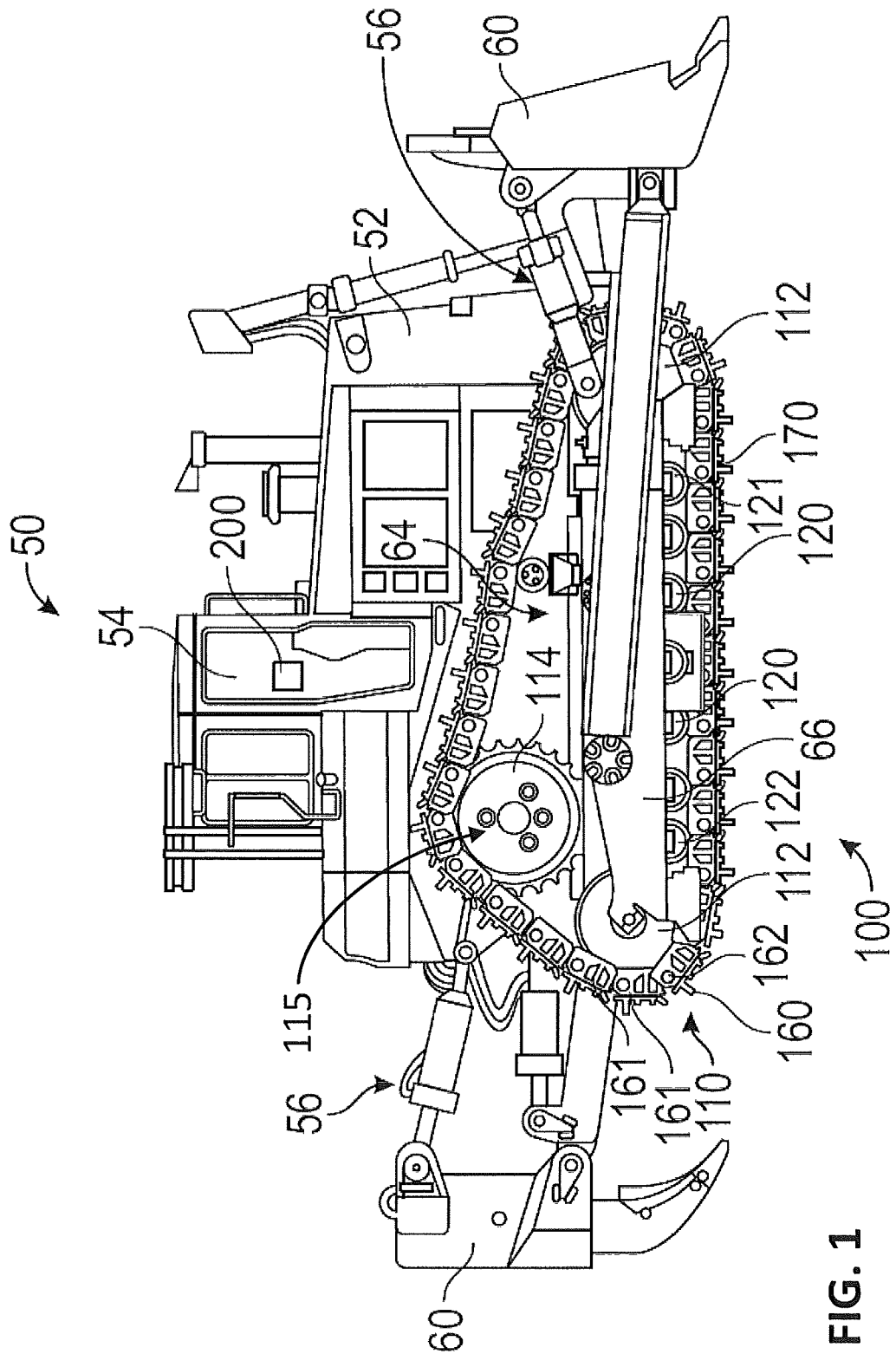
FIG. 1 is a diagrammatic side elevational view of a machine including an undercarriage track system in accordance with aspects of the disclosure.

FIG. 1 is a diagrammatic side elevational view of an aspect of a machine 50 including an undercarriage track system 100. The term "machine" may refer to any machine that performs some type of operation associated with an industry such as mining or construction, or any other industry known in the art, such as a hydraulic mining shovel, an excavator, a track-type tractor (bulldozer), a wheel loader, a cable shovel, a dragline, or the like. In the aspect illustrated, the machine 50 is a track-type tractor. The machine 50 may include a machine body 52, one or more hydraulic systems 56, one or more ground engaging implements 60, and an undercarriage structure 64. The machine body 52 may include a cab 54 to house a machine operator. An electronic control system 200 can be housed in the cab 54 that can be adapted to allow a machine operator to manipulate and articulate the ground engaging implements 60 for any suitable application. Of course the machine may be operated autonomously or remotely as well.

A hydraulic system 56 may connect at one end to the machine body 52 and may support a ground engaging implement 60 at an opposing, distal end. In aspects, the ground engaging implement 60 can be any suitable implement, such as a bucket, a clamshell, a blade, a shank, or any other type of suitable device. In the aspect illustrated, a ground engaging implement is connected to each end of the machine body 52.

The undercarriage structure 64 may include a supporting structure 66 and an undercarriage track system 100. The supporting structure 66 may connect the undercarriage track system 100 to the machine body 52 and may support the undercarriage track system 100.

The undercarriage track system 100 may include a track roller frame assembly 110 and an associated track chain assembly 160 on each side of the undercarriage structure 64. It will be appreciated that only one track roller frame assembly 110 and only one track chain assembly 160 is visible in FIG. 1.

Figure 2:
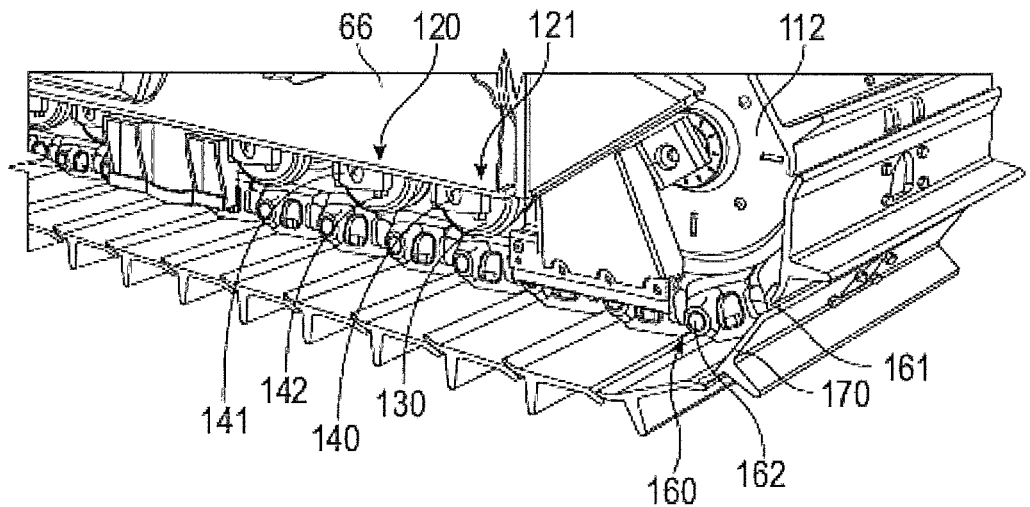
FIG. 2 is a perspective view of a portion of the undercarriage track system of FIG. 1.

FIG. 2 is a perspective view of a portion of the undercarriage track system 100. Referring to FIGS. 1 and 2, each track roller frame assembly 110 may include one or more idlers such as idler wheels 112, a drive sprocket wheel 114, and one or more rollers such as track roller assemblies 120. In the aspect illustrated, at least one of the idler wheels 112 is coupled to each end of the supporting structure 66. The drive sprocket wheel 114 may also be coupled to the supporting structure 66. In the aspect illustrated, the drive sprocket wheel 114 is adjacent the idler wheel 112 coupled to the aft end of the supporting structure 66. In other aspects, with one idler wheel 112, the drive sprocket wheel 114 may be positioned at the end of the supporting structure 66 opposite the idler wheel 112. The drive sprocket wheel 114 is powered in forward and reverse directions by an engine of machine 50. The drive sprocket wheel 114 drives the track chain assembly 160 to move the machine 50. As an example, a final drive assembly 115 may be configured to couple to the drive sprocket wheel 114 to cause rotation of the drive sprocket wheel 114 and thereby drive the track chain assembly 160. As another example, the final drive assembly 115 may include one or more gears and/or shafts. The final drive assembly 115 may be or may include a bull gear single reduction configuration, a bull gear double reduction configuration, a planetary single reduction configuration, and/or a planetary double reduction configuration. Other configurations may be used. As a further example, the final drive assembly 115 may be coupled to a transmission of the machine 50.

In an aspect, one or more rollers such as track roller assemblies 120 may be positioned between the ends of the supporting structure 66 and at least partially below the supporting structure 66. In the aspect illustrated, the roller assemblies 120 are positioned between the two idler wheels 112. In other aspects, the roller assemblies 120 are positioned between an idler wheel 112 and the drive sprocket wheel 114. The roller assemblies 120 may include a front roller assembly 121 that may be positioned adjacent the idler wheel 112 at the front end of the supporting structure 66 and a rear roller assembly 122 that may be positioned adjacent the idler wheel 112 at the rear end of the supporting structure 66. Idler wheels 112 and track roller assemblies 120 may be configured to guide a track chain assembly 160 around the supporting structure 66.

In aspects, the track chain assembly 160 may include track links 161 interconnected and linked together by track pins 162 to form a closed chain. In the aspect illustrated, track links 161 are connected to, such as by fastening, ground engaging shoes 170. The ground engaging shoes 170 or ground engaging portions may be configured to overlap. In other aspects, each track chain assembly 160 includes track pads inter-connected and linked together. The track pads may include a track link and a ground engaging shoe that are cast or forged as an integral unit.

Referring to FIG. 2, each track roller assembly 120 may include a roller 130, a roller shaft 140, a sensor 150 (shown in FIG. 3), roller bearing assemblies 149 (shown in FIG. 3), roller connection hardware 141, and roller connectors 142 configured to couple the roller connection hardware 141 to supporting structure 66. The roller connection hardware 141 may be located adjacent each end of roller 130 and may be configured to support each end of roller shaft 140. Roller connection hardware 141 may prevent roller shaft 140 from rotating.

Figure 3:
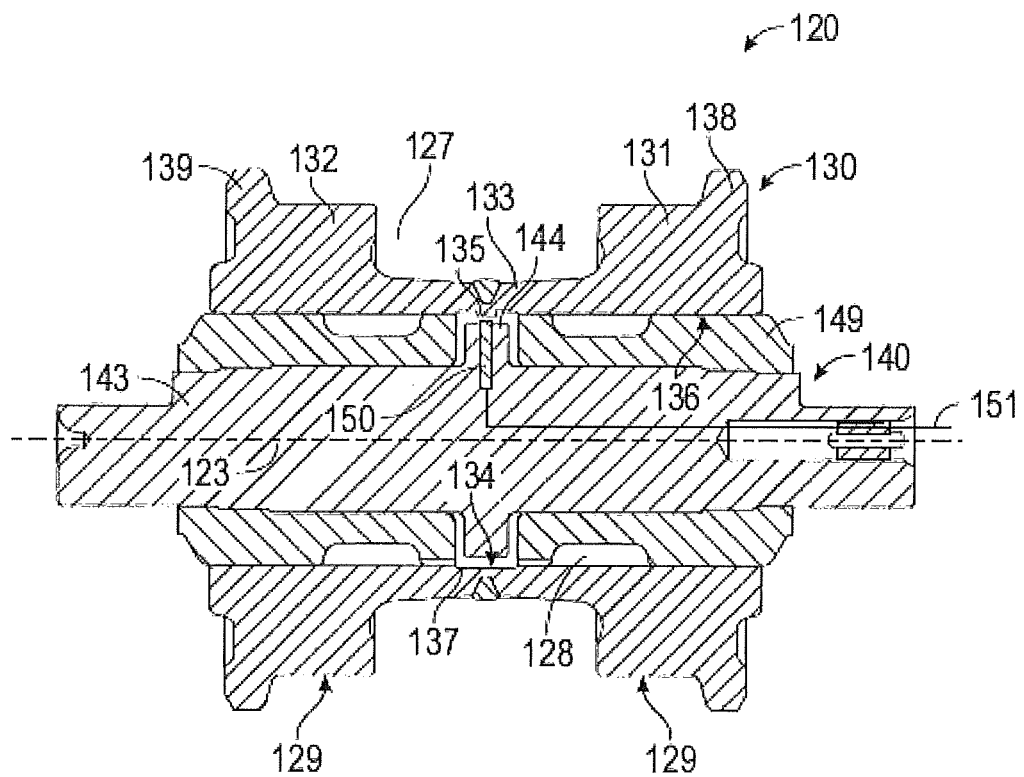
FIG. 3 is a cross-sectional view of an aspect of a track roller assembly of FIGS. 1 and 2.

FIG. 3 is a cross-sectional view of an aspect of a portion of a track roller assembly 120 of FIGS. 1 and 2. The roller 130 may generally be a solid of revolution formed by revolving a closed shape about a roller axis 123 with the closed shape offset from the roller axis 123 forming a bore 128 extending therethrough. The roller 130 may include one or more roller contact surfaces 129. Each roller contact surface 129 may be a surface of revolution revolved about roller axis 123. In the aspect illustrated, the roller 130 includes two roller contact surfaces 129 spaced apart with each roller contact surface 129 being a right circular cylinder. In some aspects, roller 130 includes a single roller contact surface 129 with a concave shape, such as a catenoid or a hyperboloid, extending between each side of the roller 130.

In the aspect illustrated, the roller 130 includes a body 133, a first guide 138, a second guide 139, and a sensed feature 135. The body 133 may be a solid of revolution with the bore 128 extending therethrough. The bore 128 may generally be defined by a bore surface 136. The bore surface 136 may define the inner surface of body 133 and may generally be a cylindrical shape, such as a right circular cylinder. The bore 128 may be configured to receive roller shaft 140 and roller bearing assemblies 149. In some aspects, the bore 128 includes an inner recess 137 extending into body 133 from bore surface 136. The inner recess 137 may include an annular shape. The inner recess 137 may include a recess surface 134.

In an aspect, the body 133 may include a first roller contact flange 131 and a second roller contact flange 132. The first roller contact flange 131 extends at one end of body 133. First roller contact flange 131 includes a roller contact surface 129. The roller contact surface 129 may be the outer surface of body 133 and of first roller contact flange 131. Second roller contact flange 132 extends at the other end of body 133 opposite first roller contact flange 131. Second roller contact flange 132 is spaced apart from first roller contact flange 131 forming an outer recess 127 therebetween. Second roller contact flange 132 also includes a roller contact surface 129. The roller contact surface 129 may be the outer surface of second roller contact flange 132. The first roller contact flange 131 and the second roller contact flange 132 may be configured to contact track links 161 or a portion of track links 161.

In an aspect, the first guide 138 may extend outward from an end of first roller contact flange 131 distal to second roller contact flange 132. The second guide 139 may extend outward from an end of second roller contact flange 132 distal to first roller contact flange 131. One or more of the first guide 138 and the second guide 139 may be configured to maintain the alignment of the track links 161 relative to the rollers 130.

In an aspect, the sensed feature 135 may be a feature configured to be detected by a sensor 150. The sensed feature 135 may be located at body 133, such as on or in body 133. The sensed feature 135 may be a protrusion, such as a tooth, or a recess, such as a slot.

In an aspect, the roller shaft 140 may extend through the roller 130 at the bore 128. The roller shaft 140 may include a shaft body 143 and a shaft flange 144. The shaft body 143 may generally include a right circular cylinder shape. The shaft flange 144 may extend outward from shaft body 143. The shaft flange 144 may be integral to the shaft body 143. The shaft flange 144 may include a diameter slightly smaller than the diameter of the bore 128.

In an aspect, one or more of the roller bearing assemblies 149 may be located between roller 130 and roller shaft 140 in the bore 128. In the aspect illustrated, the track roller assembly 120 includes two roller bearing assemblies 149 with one roller bearing assembly 149 on each side. Each roller bearing assembly 149 may be adjacent the shaft flange 144.

In the aspect, one or more of the idler wheels 112 and the track roller assembly 120 may include a sensor 150 configured to measure a rotational position and/or rotational speed of the same. As illustrated in FIG. 3, the sensor 150 may be configured to detect the sensed feature 135 as the roller 130 rotates about the roller shaft 140. As such, the sensor 150 may be used to detect revolutions and to determine, inter alia, the rotational speed of the roller 130. The sensor 150 may be a magnetic speed sensor, an optical sensor, or any other type of sensor that may be used to detect the sensed feature 135. The sensor 150 may be embedded into the roller shaft 140 or disposed adjacent thereto. In the aspect, the sensor 150 may be or may include a rotary encoder or shaft encoder configured to sense the angular position or motion of the roller shaft 140 and convert sensed information into an analog or digital signal. As an example, the rotary encoder may be configured to measure the rotational speed of the roller 130. Other sensors may be used to measure the rotational position or speed of the roller 130. In an aspect, a communication path such as a hardwire 151 may extend through a portion of roller shaft 140 to couple the sensor 150 to a processing system (e.g., electronic control system 200 (FIG. 4)).

Figure 4:
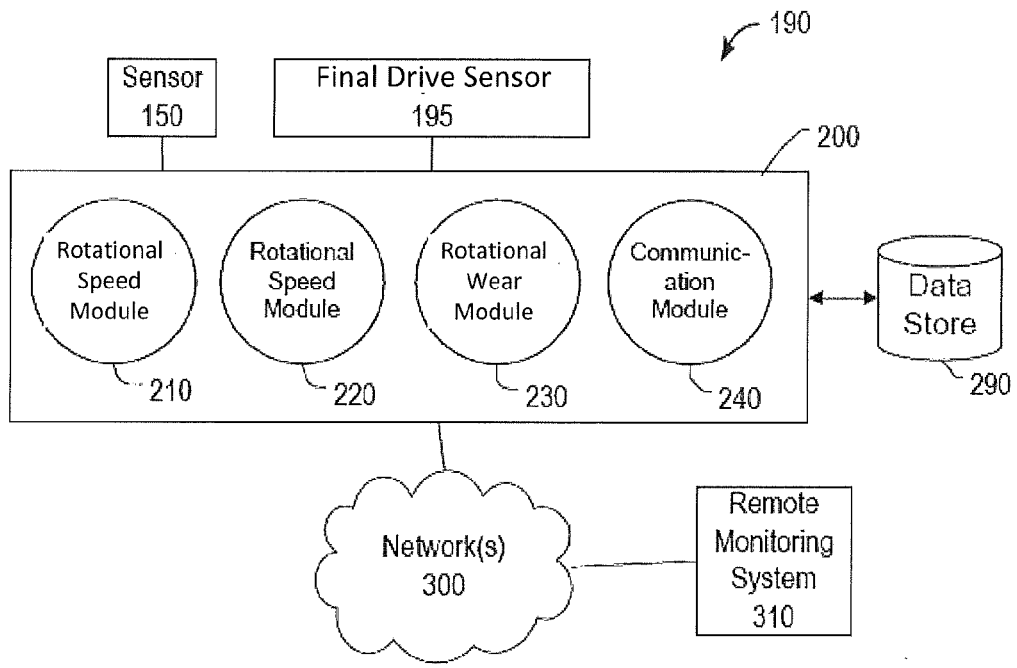
FIG. 4 is a functional block diagram of a system for determining the wear of one or more rotational components such as the rollers or idlers of FIGS. 2-3 in accordance with aspects of the disclosure.

FIG. 4 is a functional block diagram of a system 190 for determining the wear for the rollers 130 of FIGS. 2 and 3. The system 190 may include a final drive sensor 195, the sensor 150, and the electronic control system 200. The final drive sensor 195 may be electronically connected to the electronic control system 200. The final drive sensor 195 may be configured to access or receive one or more parameters (information) related to the drive sprocket wheel 114, such as the rotational position or rotational speed of the drive sprocket wheel 114 or parameters related to the transmission of the machine 50 (e.g., revolutions per minute, gear ratio, etc.). The final drive sensor 195 may be configured to transmit the accessed or received information to the electronic control system 200.

In an aspect, the sensor 150 may be configured to detect when sensed feature 135 rotates past sensor 150 and is configured to provide a rotational input signal, including when the sensor 150 detects the sensed feature 135, to the electronic control system 200. In another aspect, the sensor 150 may be configured to determine (e.g., access or receive) a rotational position and/or a rotational speed of the roller 130 and/or one or more idler wheels 112. The sensor 150 is configured to transmit the determined information to the electronic control system 200.

The electronic control system 200 may be or may include hardware, one or more software modules executed by a processor (e.g., of a computer), or a combination thereof. A software module may reside in a processor readable memory.

In aspects, the electronic control system 200 may include one or more rotational speed modules 210, 220, and a rotational wear module 230. The one or more rotational speed modules 210, 220 may be configured to access or receive information relating to a rotational position and/or a rotational speed (or velocity) of the roller 130 and/or one or more idler wheels 112. The rotational speed may be received from a sensor such as a rotary encoder. The rotational speed may be calculated, for example, based upon the RPMs of engine of the machine 50 and a gear ratio of the transmission of the machine 50.

The rotational wear module 230 may be configured to determine the wear on the roller 130 at roller contact surface 129 based on the revolutions of the roller 130 detected by the sensor 150. The rotational wear module 230 may be configured to determine the wear on one or more idler wheels 112 based on the revolutions of the idler wheels 112 detected by the sensor 150. The wear on the roller 130 and/or the idler wheels 112 will cause certain size parameters, such as the circumference, the radius, and the diameter, of the roller 130 (e.g., roller contact surface 129) and/or the idler wheels 112 to reduce over time. As the size parameters reduce, the roller 130 and/or the idler wheels 112 will rotate faster to cause the machine 50 to travel the same distance. The rotational wear module 230 may use the rotational speed relative to the rotational speed of the drive sprocket wheel 114 to determine at least one of the size parameters of the roller 130 and/or the idler wheels 112.

In some aspects, rotational wear module 230 determines the wear using Eq. 1:

$$v = 2\pi r \omega_{rad} \quad (Eq. 1)$$

where v is tangential speed, $\omega$ is rotational speed (in radians), and r is radial distance.

As an example, the tangential velocity v, as measured linearly along the track chain assembly 160, is the same for the points at which the drive sprocket wheel 114, the roller 130, and the idler wheels 112 engage the track chain assembly 160, the following Eq. 2 may be generated to compare rotation of the drive sprocket wheel 114 to a rotational component such as the roller 130 and/or one or more of the idler wheels 112:

$$2\pi r_1 * \omega_1 = v = 2\pi r_2 * \omega_2 \quad (Eq. 2)$$

where $\omega_1$ is the rotational speed of the drive sprocket wheel 114, $r_1$ is the radial distance between an axis of rotation of the drive sprocket wheel 114 and the radial point at which the drive sprocket wheel 114 engages the track chain assembly 160, $\omega_2$ is the rotational speed of the rotational component, and $r_2$ is the radial distance between an axis of rotation of the rotational component and the radial point at which the rotational component engages the track chain assembly 160.

As such, Eq. 2 can be rewritten to solve for $r_2$:

$$r_2 = \frac{r_1 \omega_1}{\omega_2} \quad (Eq. 3)$$

The radial distance $r_1$ (radius) may be known (e.g., retrieved from storage medium) and the measured values of rotational speed can be used to calculate the radial distance $r_2$ (radius). The radial distance $r_2$ (radius) may be compared to a stored value (look-up table) with an associated wear value. Accordingly, the wear of the rotational component may be determined based upon the comparative rotational speed of the rotational component and the drive sprocket wheel 114.

The system 190 may include a data store 290. The radial distance data, the rotational speed data, and the wear data may be stored in the data store 290. This may include the histogram data of each. The data store 290 may be local to the electronic control system 200 or may be remotely located to the electronic control system 200. The data store 290 may store information such as a database of size parameters for various rotational components and the associated wear. As an example, a roller having a diameter of 210.0 millimeters (mm) may be 0%, while a roller having a diameter of 202.0 mm may be 20% worn. As a further example, a reduction in diameter of a rotational component of about 1.5 mm may be associated with about a 4% wear. Other relationships and databases and tables may be stored.

Electronic control system 200 may also include a communication module 240. The communication module 240 may be configured to provide a signal to an operator when the wear on a rotation component such as the roller 130 and/or the idler wheels 112 reaches a threshold, such as a size parameter of the roller contact surface 129 reaching a predetermined value.

In some aspects, the system 190 may include a remote monitoring system 310 connected to the electronic control system 200 over a network 300. The remote monitoring system 310 may be maintained by the owner of the machine 50 or by the original equipment manufacturer of the machine 50. The communication module 240 may be configured to send the determined roller wear, such as one or more of the size parameters of the roller contact surface 129, to the remote monitoring system 310. In some aspects, communication module 240 is configured to send the average rotational and translational speeds to the remote monitoring system 310 and the wear is determined by the remote monitoring system 310. The communication module 240 may be configured to send the data to the remote monitoring system 310 on a regular interval, such as a daily interval, weekly interval, monthly interval, or quarterly interval. The communication module 240 may be configured to send the data to the remote monitoring system 310 on a communication channel as defined herein.

INDUSTRIAL APPLICABILITY

Machines, such as hydraulic mining shovels, excavators, wheel loaders, cable shovels, bucket wheels, bulldozers, draglines and the like are commonly used in the construction and mining industries to dig, excavate, move, and load materials, such as rock soil, overburden, and ore during mining and construction processes. In heavy duty applications, these machines can weigh 1,500 tons or more. The undercarriage track systems including the rollers and one or more track chain assemblies formed by interconnected track links or pads are often subject to high stresses and wear.

Wear on the rollers generally occurs over an extended period of time and may be difficult to predict. Providing a roller 130 with a sensed feature 135 allows the wear on the roller 130 to be determined at any given time during operation of the machine 50. The measured wear on the roller 130 may help an original equipment manufacturer or an owner of the machine monitor and track the wear on roller 130. The data related to the wear on the roller 130 may be used to predict when the roller 130 should be replaced and may help determine an optimal time to service the machine 50.

Figure 5:
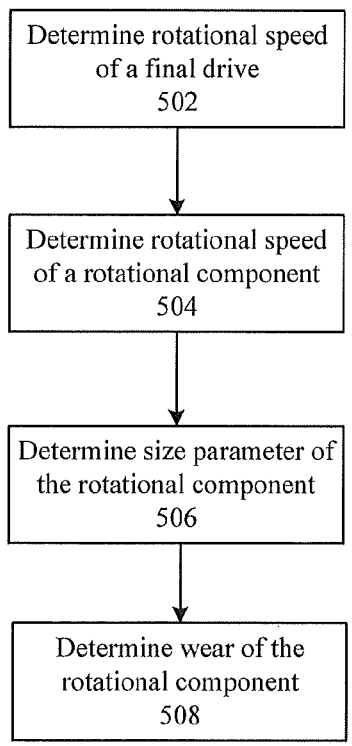
FIG. 5 is a flowchart of a method for determining the wear of one or more rotational components in accordance with aspects of the disclosure.

FIG. 5 is a flowchart of a method for determining the wear on a rotation component such as the roller 130 and/or the idler wheels 112. The method includes determining, by one or more processors, a rotational speed of a drive sprocket of the undercarriage, at 502. As an example, the drive sprocket is configured to rotate about a first axis. As an example, the rotational component is configured to rotate about a second axis that is parallel to the first axis. As another example, determining the rotational speed of the drive sprocket includes receiving information from a rotary encoder configured to measure rotation of the drive sprocket. As a further example, determining the rotational speed of the drive sprocket is based at least on a gear ratio of a transmission applying force to the drive sprocket.

At 504 a rotational speed of the rotational component may be determined. As an example, determining the rotational speed of the rotational component includes receiving information from a rotary encoder configured to measure rotation of the rotational component.

At 506, a size parameter of the rotational component may be determined based on at least the determined rotational speed of the drive sprocket and the determined rotational speed of the rotational component. As an example, determining the size parameter of the rotational component includes calculating a radius of rotation of the rotational component.

At 508, the wear of the rotational component may be determined based on the determined size parameter of the rotational component. As an example, determining the wear of the rotational component includes comparing the determined size parameter of the rotational component to a stored size parameter.

Those of skill will appreciate that the various illustrative logical blocks, modules, and algorithm steps described in connection with the aspects disclosed herein can be implemented as electronic hardware, computer software, or combinations of both. To clearly illustrate this interchangeability of hardware and software, various illustrative components, blocks, modules, and steps have been described above generally in terms of their functionality.

Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure. In addition, the grouping of functions within a module, block, or step is for ease of description. Specific functions or steps can be moved from one module or block without departing from the disclosure.

The various illustrative logical blocks and modules described in connection with the aspects disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the aspects disclosed herein can be embodied directly in hardware, in a software module executed by a processor (e.g., of a computer), or in a combination of the two. A software module can reside, for example, in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

In at least some aspects, a processing system (e.g., electronic control system 200) that implements a portion or all of one or more of the technologies described herein may include a general-purpose computer system that includes or is configured to access one or more computer-accessible media.

Figure 6:
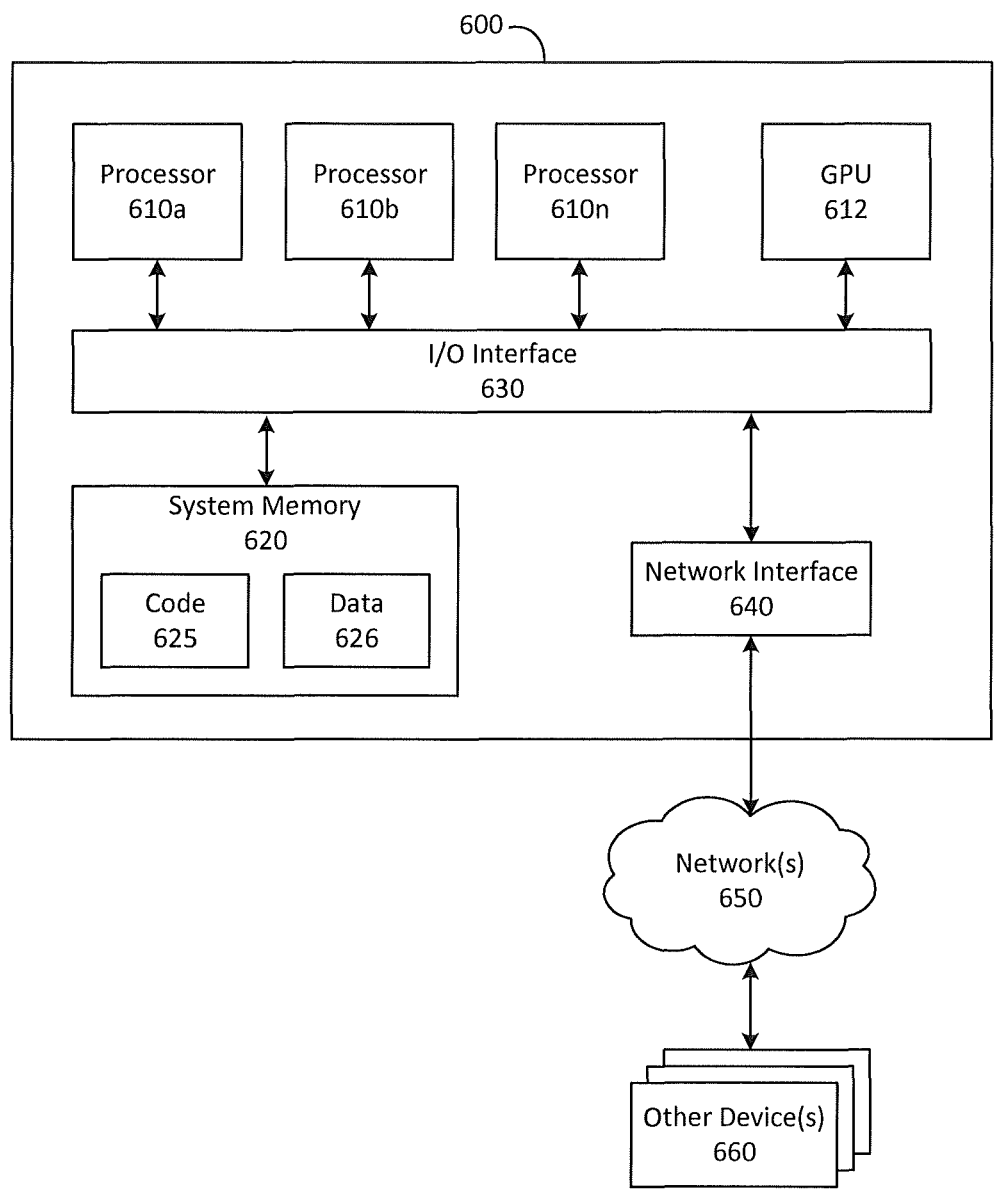
FIG. 6 is a block diagram of a computer system configured to implement the method of FIG. 5 in accordance with aspects of the disclosure.

FIG. 6 depicts a general-purpose computer system that includes or is configured to access one or more computer-accessible media. In the illustrated aspect, a computing device 600 includes one or more processors 610a, 610b, and/or 610n (which may be referred herein singularly as a processor 610 or in the plural as the processors 610) coupled to a system memory 620 via an input/output (I/O) interface 630. Computing device 600 further may include a network interface 640 coupled to I/O interface 630.

In various aspects, computing device 600 may be a uniprocessor system including one processor 610 or a multiprocessor system including several processors 610 (e.g., two, four, eight, or another suitable number). Processors 610 may be any suitable processors capable of executing instructions. For example, in various aspects, processor(s) 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some aspects, a graphics processing unit ("GPU") 612 may participate in providing graphics rendering and/or physics processing capabilities. A GPU may, for example, include a highly parallelized processor architecture specialized for graphical computations. In some aspects, processors 610 and GPU 612 may be implemented as one or more of the same type of device.

System memory 620 may be configured to store instructions and data accessible by processor(s) 610. In various aspects, system memory 620 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within system memory 620 as code 625 and data 626.

In one aspect, I/O interface 630 may be configured to coordinate I/O traffic between processor(s) 610, system memory 620 and any peripherals in the device, including network interface 640 or other peripheral interfaces. In some aspects, I/O interface 630 may perform any necessary protocol, timing or other data transformations to convert data signals from one component (e.g., system memory 620) into a format suitable for use by another component (e.g., processor 610). In some aspects, I/O interface 630 may include support for devices attached through various types of peripheral buses, such as a variant of the Peripheral Component Interconnect (PCI) bus standard, the Universal Serial Bus (USB) standard, or the like, for example. In some aspects, the function of I/O interface 630 may be split into two or more separate components, such as a north bridge and a south bridge, for example. Also, in some aspects some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various aspects, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some aspects, system memory 620 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some aspects of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, aspects of the disclosure may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the disclosure. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of certain aspects of the disclosure.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the track roller assembly and electronic control system in accordance with this disclosure can be implemented in various other configurations and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. A method for determining wear of a rotational component of an undercarriage system for a machine having a track chain assembly, the method comprising:
   receiving, by one or more processors, information relating to a rotational speed of a drive sprocket of the undercarriage system, wherein the drive sprocket is configured to engage the track chain assembly at a first radial distance from a first axis of rotation;
   receiving, by the one or more processors, information relating to a rotational speed of a rotational component of the undercarriage system, wherein the rotational component is configured to engage the track chain assembly at a second radial distance from a second axis of rotation;
   determining, by the one or more processors, the second radial distance based on at least the determined rotational speed of the drive sprocket, the determined rotational speed of the rotational component, and the first radial distance; and
   determining, by the one or more processors, the wear of the rotational component based on the determined second radial distance.

2. The method of claim 1, wherein the rotational component comprises one or more of a roller assembly and an idler.

3. The method of claim 1, wherein the information relating to the rotational speed of the drive sprocket of the undercarriage system is received from a rotary encoder configured to measure rotation of the drive sprocket.

4. The method of claim 1, wherein the information relating to the rotational speed of the drive sprocket of the undercarriage system comprises a gear ratio of a transmission applying force to the drive sprocket.

5. The method of claim 1, wherein the information relating to the rotational speed of the rotational component of the undercarriage system is received from a rotary encoder configured to measure rotation of the rotational component.

6. The method of claim 1, wherein determining the second radial distance comprises retrieving the first radial distance from a storage medium.

7. The method of claim 1, determining the wear of the rotational component comprises comparing the determined second radial distance to a stored size parameter.

8. A system comprising:
   a processor; and
   a memory bearing instructions that, upon execution by the processor, cause the system at least to:
      determine a rotational speed of a drive sprocket of the undercarriage, wherein the drive sprocket is configured to rotate about a first axis;
      determine a rotational speed of the rotational component, wherein the rotational component, is configured to rotate about a second axis that is parallel to the first axis;
      determine a size parameter of the rotational component based on at least the determined rotational speed of the drive sprocket and the determined rotational speed of the rotational component; and
      determine the wear of the rotational component based on the determined size parameter of the rotational component.

9. The system of claim 8, wherein the rotational component comprises one or more of a roller assembly and an idler.

10. The system of claim 8, wherein determining the rotational speed of the drive sprocket comprises receiving information from a rotary encoder configured to measure rotation of the drive sprocket.

11. The system of claim 8, wherein determining the rotational speed of the drive sprocket is based at least on a gear ratio of a transmission applying force to the drive sprocket.

12. The system of claim 8, wherein determining the rotational speed of the rotational component comprises receiving information from a rotary encoder configured to measure rotation of the rotational component.

13. The system of claim 8, determining the wear of the rotational component comprises comparing the determined size parameter of the rotational component to a stored size parameter.

14. A method for determining wear of a rotational component of an undercarriage for a machine, the method comprising:
   determining, by one or more processors, a rotational speed of a drive sprocket of the undercarriage, wherein the drive sprocket is configured to rotate about a first axis;
   determining, by the one or more processors, a rotational speed of the rotational component, wherein the rotational component, is configured to rotate about a second axis that is parallel to the first axis;
   determining, by the one or more processors, a size parameter of the rotational component based on at least the determined rotational speed of the drive sprocket and the determined rotational speed of the rotational component; and
   determining, by the one or more processors, the wear of the rotational component based on the determined size parameter of the rotational component.

15. The method of claim 14, wherein the rotational component comprises one or more of a roller assembly and an idler.

16. The method of claim 14, wherein determining the rotational speed of the drive sprocket comprises receiving information from a rotary encoder configured to measure rotation of the drive sprocket.

17. The method of claim 14, wherein determining the rotational speed of the drive sprocket is based at least on a gear ratio of a transmission applying force to the drive sprocket.

18. The method of claim 14, wherein determining the rotational speed of the rotational component comprises receiving information from a rotary encoder configured to measure rotation of the rotational component.

19. The method of claim 14, wherein determining the size parameter of the rotational component comprises calculating a radius of rotation of the rotational component.

20. The method of claim 14, determining the wear of the rotational component comprises comparing the determined size parameter of the rotational component to a stored size parameter.

* * * * *